United States Patent [19]

Roxborough

[11] Patent Number: 5,191,246
[45] Date of Patent: Mar. 2, 1993

[54] MAGNETICALLY ISOLATED BOLTS FOR LINEAR INDUCTION MOTOR

[75] Inventor: Andrew Roxborough, Kingston, Canada

[73] Assignee: UTDC Inc., Kingston, Canada

[21] Appl. No.: 757,227

[22] Filed: Sep. 10, 1991

[51] Int. Cl.$^5$ .............................................. H02K 41/00
[52] U.S. Cl. .......................................... 310/13; 310/42; 310/91; 310/217; 310/256
[58] Field of Search .................. 310/12, 13, 15, 16, 310/17, 58, 59, 64, 65, 217, 256, 42, 52, 91

[56] References Cited

U.S. PATENT DOCUMENTS

| | | | |
|---|---|---|---|
| 1,158,495 | 11/1915 | Hellmund | 310/64 |
| 1,487,221 | 3/1924 | Ehrmann | 310/64 |
| 2,735,950 | 2/1956 | Brown | 310/64 |
| 2,838,703 | 6/1958 | Balke | 310/42 |
| 3,940,648 | 2/1976 | Wielt | 310/217 |
| 4,021,691 | 5/1977 | Dukshtau | 310/217 |
| 4,642,493 | 2/1987 | Wallace | 310/13 |
| 4,745,320 | 5/1988 | Oyama | 310/217 |
| 4,765,504 | 8/1988 | Sauerwein | 310/217 |
| 4,894,904 | 1/1990 | Tanaka | 310/42 |

FOREIGN PATENT DOCUMENTS 836604  6/1960  United Kingdom ............. 310/256

Primary Examiner—R. Skudy
Attorney, Agent, or Firm—Baker & Daniels

[57] ABSTRACT

A primary for a linear induction motor is formed from laminae which are bolted together. The bolts are located in protuberances on the opposite edge to the teeth so as to be outside the path of substantial flux penetration.

8 Claims, 3 Drawing Sheets

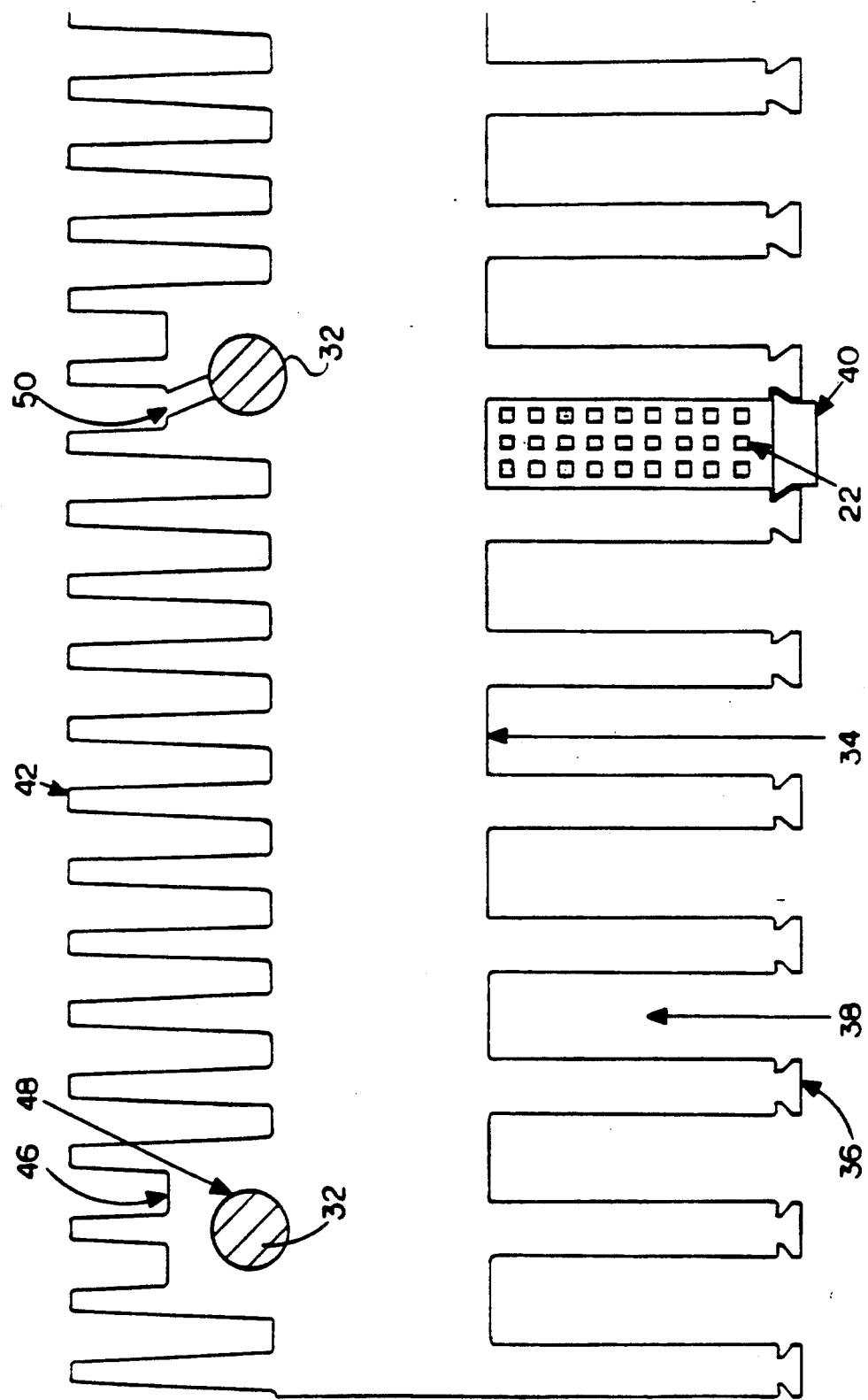

MAGNETICALLY ISOLATED BOLTS FOR LINEAR INDUCTION MOTOR

This invention relates to linear induction motors.

Linear induction motors have found increasing use in a number of applications. Their use is particularly beneficial in the propulsion of railed vehicles where they avoid the need to transmit torque through the vehicle wheels and so reduce the wear rate of the tracks and wheels of the system.

The primaries of linear induction motors used in transportation systems are conventionally carried by the vehicle and consist of a laminated core with windings disposed in teeth on the core to generate a magnetic field between a primary and a secondary of the system. The secondary will be secured to the track and so a thrust is developed between the vehicle and the track.

The laminations of the core are clamped to one another by bolts passing transversely through the core. These bolts can establish secondary transverse electric loops that impair the operation of the linear induction motor. Accordingly, the shank of the bolts is insulated where they pass through the laminations and also require an insulating washer beneath the bolthead and nut, where the bolts are secured to the supporting frame. The provision of the insulating washers makes it difficult to apply sufficient torque to clamp effectively the laminations to one another. Moreover, because the bolts have to be insulated from the laminations, a clearance has to be provided in the bolt holes in the laminations.

These considerations have resulted in a core structure in which the laminations of the core have the facility to move relative to one another. It will be appreciated that the motor is subjected to quite severe heating and cooling cycles in use, which, together with the rigors imposed by the motor being carried by a vehicle, may induce relative movement of the laminations on the bolts. This movement may in some circumstances cause fretting of the bolt insulation and of the insulation of the winding passing through the teeth. Generally speaking therefore, although the prior linear induction motors have been used successfully in revenue service, attention must be paid in the assembly and maintenance of the primaries.

It is therefore an object of the present invention to provide a primary for a linear induction motor in which the above disadvantages are obviated or mitigated.

In general terms the present invention seeks to overcome these disadvantages by providing the laminations of the primary with a body portion having teeth extending from one edge to accommodate the windings. Protuberances are formed on the opposite edge with apertures to receive the bolts. The bolts are therefore located outside the path of substantial flux penetration. This obviates the need for insulation of the bolts as any secondary transverse loops established by the bolts are relatively small compared with the overall flux path. Because the bolts are no longer insulated, they can provide a close fit with the lamination and also be torqued to a degree sufficient to prevent relative movement between the laminations.

An embodiment of the present invention will now be described by way of example only with reference to accompanying drawings in which:

FIG. 3 is a view on an enlarged scale on the line 3—3 of FIG. 1 showing a portion of the primary.

Figure 1:
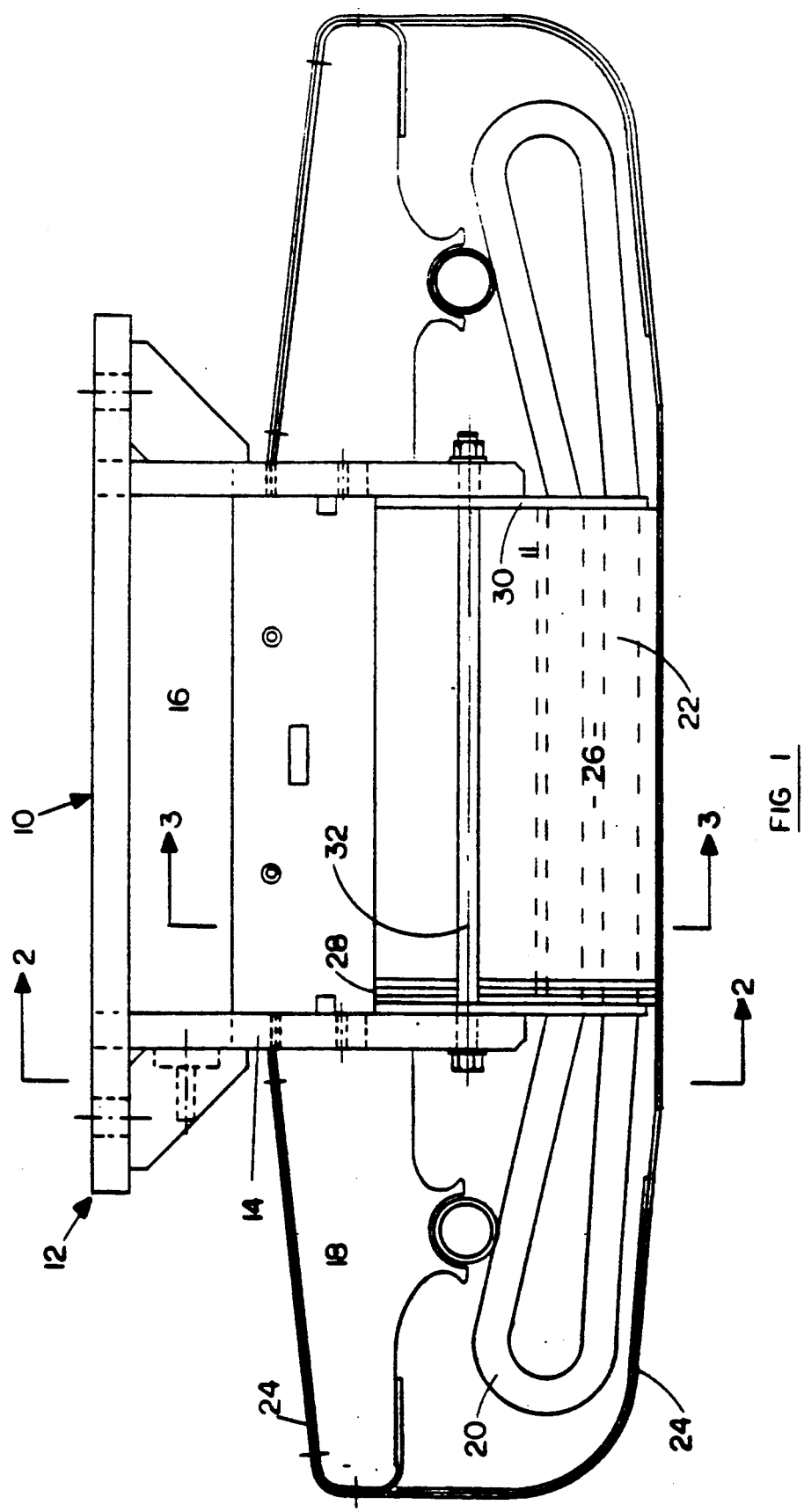
FIG. 1 is a front elevation partly in section on the line 1—1 of FIG. 2 of the primary of a linear induction motor.

Referring therefore to the drawings, a linear induction motor includes a support frame 12 which is used to secure the primary 10 to a vehicle (not shown).

Frame 12 includes a pair of longitudinal side rails 14.

Outriggers 18 extend laterally from the side rails and support end turns 20 of the windings 22 of the motor 10. Outriggers 18 also support upper and lower side covers which encompass the end turns 20.

A core 26 is located between the side rails 14 and consists of a plurality of laminations 28 extending the length of the primary 10. A pair of fingerplates 30 are interposed between the laminations 28 and side rails 14, and the laminations are secured to the side rails by transverse bolts 32. Each of the fingerplates 30 is jogged toward its lower end so that in free body form the lower end of plate 30 makes line contact with the laminations.

Figure 2:
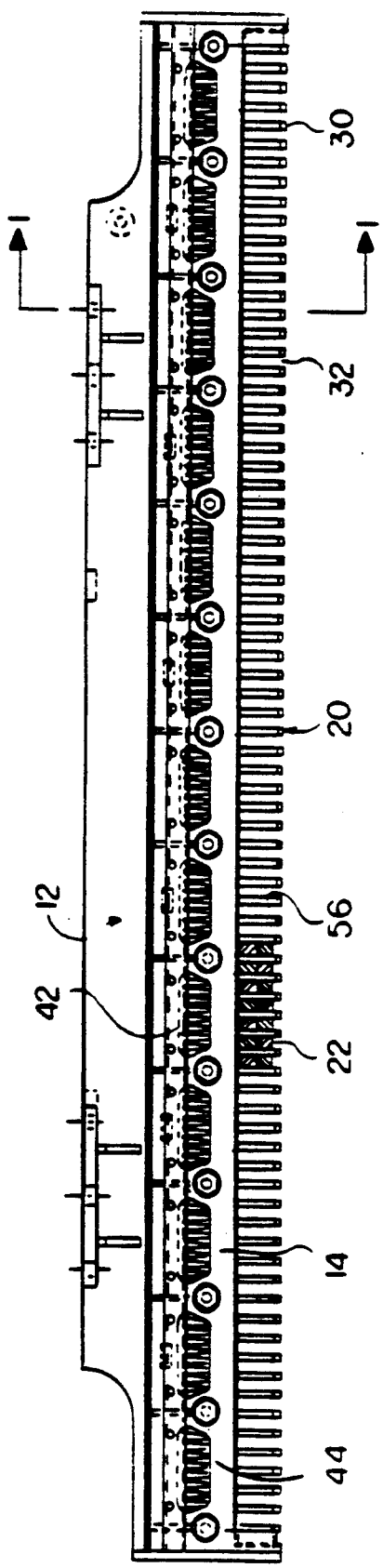
FIG. 2 is a view on the line 2—2 of FIG. 1.

As may best be seen in FIGS. 2 and 3, each of the laminations 28 consists of a body portion 34 with a plurality of teeth 36 formed along one edge. The teeth 36 define slots 38 which receive the windings 22. Windings 22 are secured within the slots by wedges 40. The disposition of the teeth 36, windings 22 and wedges 40 is well known in the art and described more fully in U.S. Pat. No. 4,642,493.

As such further description of the windings is not believed necessary.

Disposed on the opposite edge of the body portion 34 to the teeth 36 are plurality of upstanding fins 42. Fins 42 are used to increase the surface area of the core 26 and thereby increase the heat transfer from the core 26 to the surrounding atmosphere. In this regard, it will be noted from FIG. 2 that the rails 14 include a plurality of apertures 44 juxtaposed with a number of the fins 42 so that cooling air may be directed over the upper surface of the core 26 between the fins 42 and out through the apertures 44. This arrangement is more fully described in our copending application Ser. No. 07/667588. Bolt holes are located in the rails 14 between apertures 44 to receive bolts 32.

When windings 22 are energized, a magnetic flux path is established through the core 26. The body portion 34 is located in the flux path which is completed by the air gap and reaction rail which cooperates with the primary 10.

On the opposite edge of the body portion 34 to the teeth 36 are a plurality of protuberances 46 located adjacent the root of selected ones of the fins 42. Protuberance 46 is formed with an aperture that receives one of the bolts 32. The bolt 32 is a close fit within the aperture 48 and no insulation is provided between the bolt 32 and the lamination.

Aperture 48 is located outside the predominant path of the magnetic flux flowing in the body portion so that the flux density to which the bolts 32 are subjected is minimised. Therefore, the secondary magnetic currents that may flow through adjacent bolts and the intervening side frames are likewise minimal and do not significantly impair the efficiency of the motor.

In practise, the laminations are stamped from suitable stock and stacked one above the other to form the core 26. The fingerplates 30 are then located on opposite outer surfaces with the lower end of the fingerplates to impinging on the outer laminations. The core 26 is then inserted between the side rails 14 until the apertures 48 are aligned with corresponding apertures provided in the rails 14. The bolts 32 are then inserted and tightened sufficiently to clamp the laminations against one another. As the bolt is tightened, the lower edge of the fingerplates bears against the lower portion of the laminations to prevent any outward spreading of the laminations.

Because the bolts 32 are not insulated from the frame and laminations, they can be both a tight fit within the laminations and adequate torque can be applied to clamp effectively the laminations to one another. This insures the laminations do not move relative to one another during normal service. The fretting to which the insulation on the coils has in the past been subjected to is largely avoided.

It will of course be appreciated that alternate fasting means can be provided other than the bolts 32, such as a permanent rivet structure but it is believed that bolts are the most convenient for assembly and disassembly of the motor. Similarly, it will be appreciated that fins 42 may not always be provided depending upon the service and cooling requirements of the core 26, in which case the protuberances 46 would simply be formed on the upper edge of body portion 34 as castellations.

It will be seen therefore that the disadvantages of the prior linear induction motors have been overcome in a simple yet effective manner.

If necessary, to further reduce the secondary magnetic currents, a discontinuity or slot indicated at 50 in FIG. 3 may be provided extending from the aperture 48 to the periphery of the protuberance 46. The discontinuity would provide a magnetic open circuit in the flux path and therefore further reduces the flux that may flow through the protuberance 46. At the same time, the discontinuity does not adversely affect the structural integrity of the laminations.

We claim:

1. A primary for a linear induction motor having a core formed from a plurality of juxtaposed laminae each having a body portion with teeth extending from an edge of the body portion, coils wound in said teeth to induce a magnetic flux path through said core, and fastening means extending through said laminae to clamp said laminae to one another, said body portion including a plurality of protuberances on an edge of said body portion opposite to said teeth and an aperture in each of said protuberances to receive said fastening means, said fastening means thereby being substantially outside said magnetic flux path in said core.

2. A primary according to claim 1 wherein one of said protuberances includes a discontinuity extending from said aperture to a periphery of said protuberance.

3. A primary according to claim 1 wherein a plurality of fins are formed on said opposite edge and said protuberances are located within selected ones of said fins.

4. A primary according to claim 1 wherein said laminae are located between a pair of rail members and said fastening means extend through said rail members.

5. A primary according to claim 4 wherein a plurality of fins are formed on said opposite edge and said protuberances are located within selected ones of said fins.

6. A primary according to claim 5 wherein said rail members include a plurality of apertures each overlying a plurality of said fins and said fastening means are located between adjacent pairs of apertures.

7. A primary according to claim 1 wherein said fastening means are bolts.

8. A primary according to claim 4 wherein a plate is located between each of said rail members and said core, each of said plates having an inwardly directed portion remote from said fastening means to bear against an outer one of said laminae.

* * * * *